United States Patent [19]

Padgett

[11] Patent Number: 4,712,324
[45] Date of Patent: Dec. 15, 1987

[54] FISHHOOK AND LURE RETRIEVING DEVICE

[76] Inventor: Bobby R. Padgett, Rte. 5 - Box 684, Chipley, Fla. 32428

[21] Appl. No.: 892,852

[22] Filed: Aug. 4, 1986

[51] Int. Cl.⁴ .............................................. A01K 97/00
[52] U.S. Cl. ....................................................... 43/17.2
[58] Field of Search .......................... 43/17.2; 16/115

[56] References Cited

U.S. PATENT DOCUMENTS

| | | | |
|---|---|---|---|
| 1,851,370 | 3/1932 | Munger | 43/17.2 |
| 2,083,814 | 6/1937 | Bence | 43/17.2 |
| 2,344,838 | 3/1944 | Van Sickle | 43/17.2 |
| 2,724,207 | 11/1955 | Miller et al. | 43/53.5 |
| 2,758,406 | 8/1956 | Childress | 43/17.2 |
| 2,770,062 | 11/1956 | Russell | 43/17.2 |
| 2,906,050 | 9/1959 | Foster et al. | 43/17.2 |
| 2,948,077 | 8/1960 | Karpes | 43/17.2 |
| 3,039,223 | 6/1962 | Pavek | 43/17.2 |
| 3,513,952 | 5/1970 | Warner, Jr. | 16/115 |
| 4,171,587 | 10/1979 | Bullen, Jr. | 43/17.2 |
| 4,395,840 | 8/1983 | Banks, Jr. | 43/17.2 |
| 4,433,501 | 2/1984 | Maxwell | 43/17.2 |
| 4,508,467 | 4/1985 | Choffin | 43/17.2 X |
| 4,619,065 | 10/1986 | Jones | 43/17.2 X |

Primary Examiner—M. Jordan
Assistant Examiner—Carmine Cuda
Attorney, Agent, or Firm—Roylance, Abrams, Berdo & Goodman

[57] ABSTRACT

A device for engaging and manipulating a snagged fish line, fishhook and/or lure is provided including a pole and a tip. The tip is attached to a first end of the pole. The tip includes a substantially continuous outer surface, an interior line engaging area spaced inward from the continuous outer surface, a barrier separating the outer surface and the line engaging area and a passageway extending between the outer surface and the line engaging area. The line engaging area is oriented perpendicular to the longitudinal axis of the pole. The tip may be flat and oriented parallel to the longitudinal axis of the pole. The tip may also extend forward of the first end of the pole and have a flat surface opposite the pole. The tip may be comprised of a curved wire element or a solid substantially continuous plate member. The pole may be comprised of telescopable sections which can be interlocked in extended positions.

16 Claims, 6 Drawing Figures

U.S. Patent    Dec. 15, 1987    Sheet 1 of 2    4,712,324
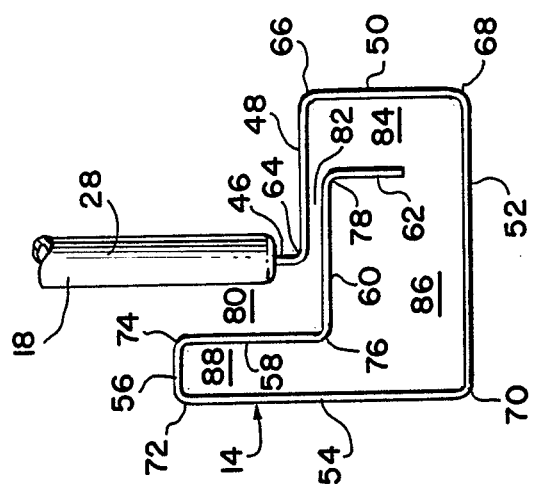
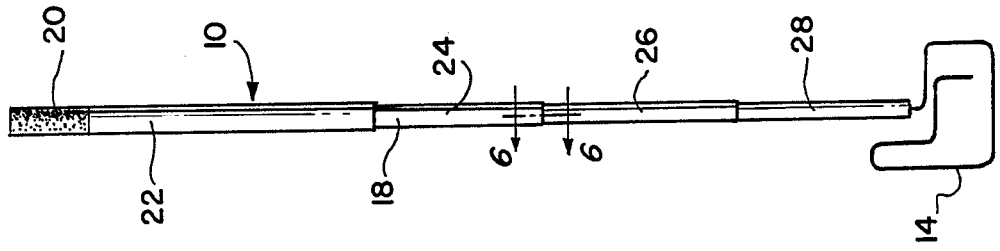
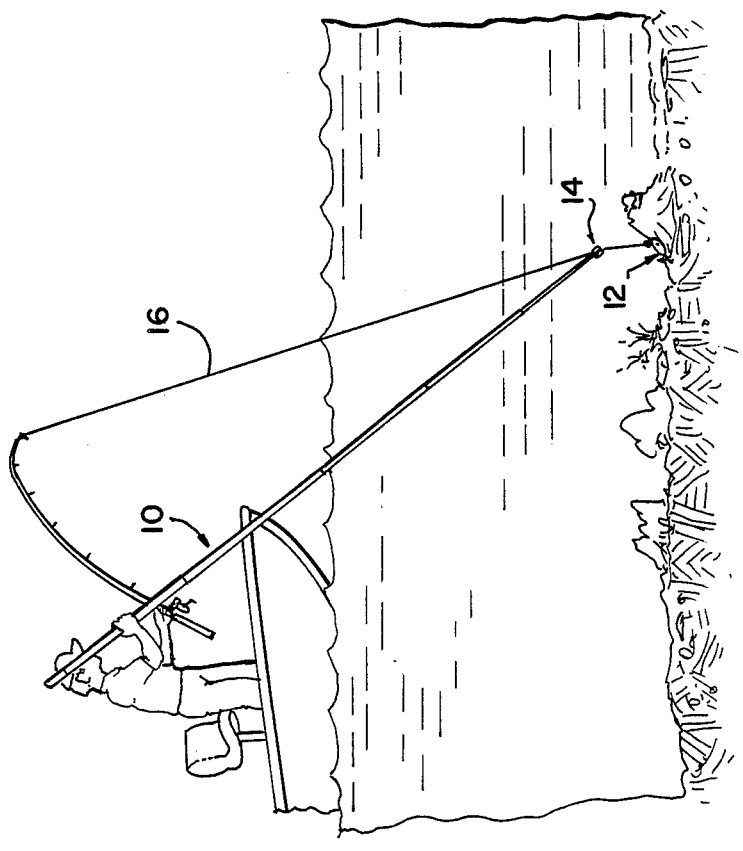

FIG. 3.
FIG. 4.
FIG. 6.
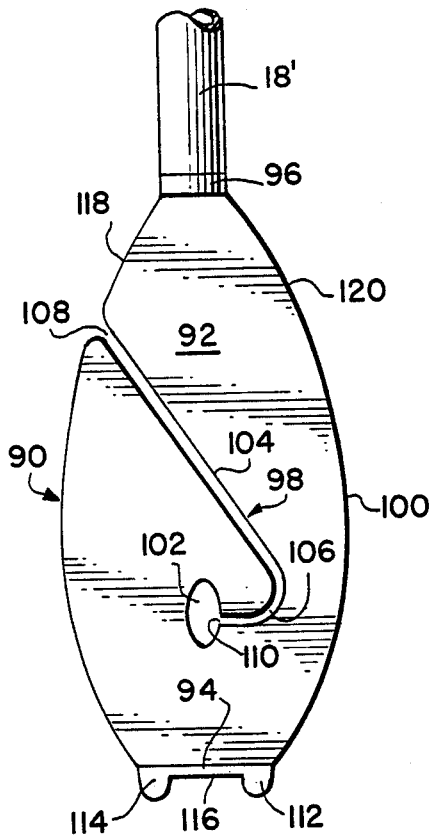
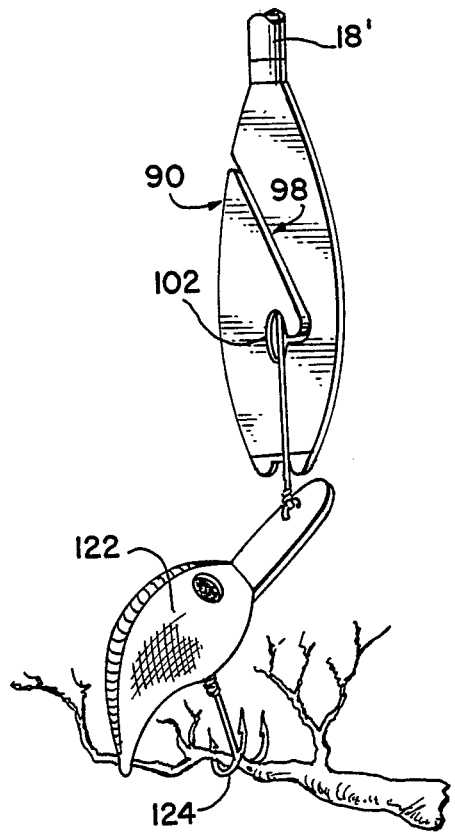
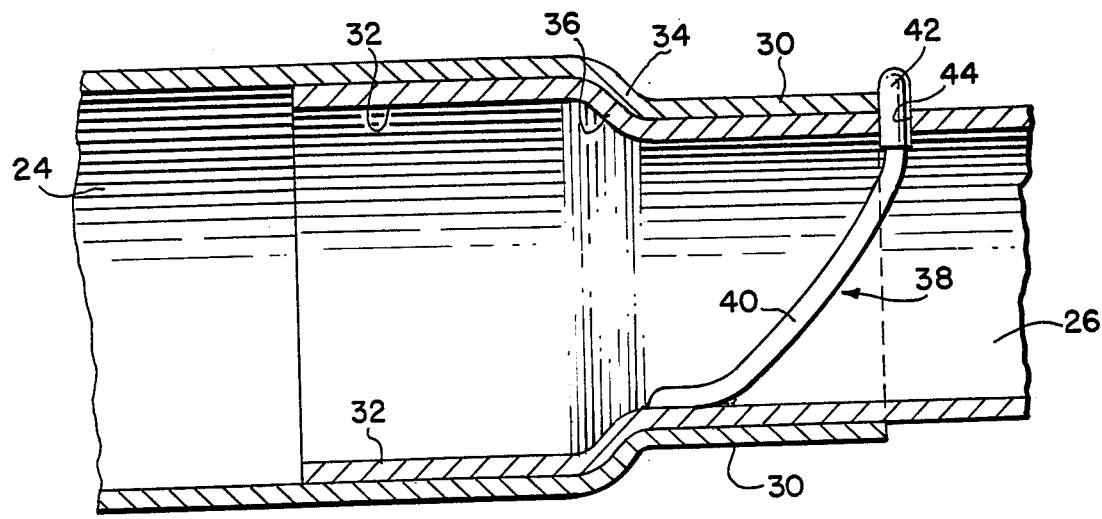

FISHHOOK AND LURE RETRIEVING DEVICE

FIELD OF THE INVENTION

This invention relates to devices for retrieving fishhooks and lures which have become snagged on an underwater object. In particular, this invention relates to such devices which include an elongated pole and a tip on one end of the pole to engage the fish line fishhook and/or lure which are snagged.

BACKGROUND OF THE INVENTION

Fishhooks and lures often become snagged on underwater objects such as old tree trunks, fallen trees and underwater brush during use. Since fish lures may be expensive and highly prized personal property, some being handmade one-of-a-kind items, fisherman often strongly desire to retrieve these snagged lures.

This is not an insurmountable problem if the fishhook and lure is snagged on an object located on shore, in shallow water or within an arms reach below the surface of the water. However, if the fishhook and lure are snagged in deep water, they cannot be easily retrieved by hand and it may not be possible to free the fishhook and lure by maneuvering the line. Such attempts may result in the breaking of the line which may render it impossible to find and retrieve the fishook and lure.

In view of this desire to retrive fishhooks and lures snagged in relatively deep water, devices have been developed to aid in these efforts. Such devices include an elongated pole having a tip on one end. The tip is designed to engage and maneuver the fish line to which the snagged fishhook and lure is attached, or to directly engage the lure and fishhook. Such devices are disclosed in U.S. Pat. No. 2,083,814 to Bence (issued June 15, 1937), U.S. Pat. No. 2,344,838 to Van Sickle (issued Mar. 21, 1944), U.S. Pat. No. 2,758,406 to Childress (issued Aug. 14, 1956), U.S. Pat. No. 2,770,062 to Russell (issued Nov. 13, 1956), U.S. Pat. No. 2,948,077 to Karpes (issued Aug. 9, 1960), U.S. Pat. No, 4,395,840 to Banks (issued Aug. 2, 1983) and U.S. Pat. No. 4,508,467 to Choffin (issued Apr. 2, 1985). In addition, U.S. Pat. No. 2,724,207 to Miller et al. (issued Nov. 22, 1955) discloses a fishhook remover for removing a fishhook from the mouth of a caught fish.

While all of the devices disclosed in the listed patents (except for U.S. Pat. No. 2,724,807) are designed to retrieve fishhooks and lures which have become snagged, none of these devices has achieved any commercial success, apparently due to their ineffectiveness.

Therefore, there remains a need in the art for a fishhook and a lure retrieving device which is effective, relatively inexpensive and easy to employ. This invention fulfills this need in the art, as well as other needs which will become apparent to those skilled in the art once given this disclosure.

SUMMARY OF THE INVENTION

This invention addresses these needs in the art by providing a device for engaging and manipulating a snagged fish line comprising a pole having first and second ends and a tip located at the first end of the pole. The tip comprises a substantially continuous outer surface and first means forming an interior line engaging area inward of the outer surface. The line engaging area extends through the tip. The first means also forms a barrier between the outer surface and the line engaging area. The tip also comprises second means forming a passageway from the outer surface to the line engaging area. The interior line engaging area is perpendicular to the longitudinal axis of the pole.

In some embodiments of the invention, the passageway has a linear component parallel to the longitudinal axis of the pole. Also, the tip may be flat and oriented parallel to the longitudinal axis of the pole.

Moreover, the tip may extend forward of the first end of the pole and have a flat surface opposite the pole.

In some embodiments of the invention, the tip is a substantially continuous solid member. The interior line engaging area may comprise an eye in the tip and the axis of the eye may be perpendicular to the longitudinal axis of the pole. The eye may be oval shaped and the passageway may be hook-shaped having a straight portion and a curved portion. A first end of the straight portion may open to the exterior of the tip and the second end of the straight may interface with a first end of the curved portion. The second end of the curved portion may open into the eye. The tip may be a plate member having side faces lying substantially parallel to the longitudinal axis of the pole.

In other embodiments of this invention, the tip comprises a curved wire lying parallel to the longitudinal axis of the pole. This curved wire may be comprised, in sequence, of a first portion perpendicular to the longitudinal axis of the pole, a second portion parallel to the longitudinal axis of the pole and extending away from the pole, a third portion perpendicular to the longitudinal axis of the pole and extending past the longitudinal axis of the pole, a fourth portion parallel to the longitudinal axis of the pole and extending back towards the pole, a fifth portion perpendicular to the longitudinal axis of the pole and extending towards the pole, a sixth portion parallel to the pole in overlapping relationship with the fourth portion, a seventh portion extending perpendicular to the longitudinal axis of the pole and an eighth portion extending parallel to the longitudinal axis of the pole in overlapping relationship with the second portion.

The passageway may be formed by the first, second, sixth, seventh and eighth portions and the line engaging area may be formed by the fourth, fifth and sixth portions. The fourth and sixth portions may overlap the pole and the first end of the pole may form a portion of the passageway.

In yet other embodiments of the invention, the pole is comprised of telescopable sections which are interlockable with respect to each other. Snap lock assemblies may be provided to interlock each pair of adjacent sctions. The snap lock assemblies may include a spring loaded button which projects through holes in the sections to interlock the sections. The sections may be tubes of decreasing diameter from the second end of the pole to the first end of the pole. The adjacent sections may overlap at their ends. The larger of the two adjacent sections may have a decreasing diameter flange located at the overlap of the smaller tube of the adjacent pair may have a flange of increasing diameter at the overlap. The increasing diameter flange fits inside the larger diameter tube and the decreasing diameter flange of the larger tube fits snugly over the smaller tube to form a "double bell" joint.

The devices according to this invention have many advantages over prior fishhook and lure retrieving devices including the following. First, the devices according to this invention are easy to maneuver and position to retrieve snagged fishhooks and lures.

A snagged fish line is engaged by a device according to this invention in a direction parallel to the axis of the pole. Once engaged, the device can be easily maneuvered to guide the fish line through the passageway into the interior line engaging area. Once the snagged fish line has entered the interior line engaging area and the tip has been maneuvered adjacent the snagged fishhook or lure, a tap in the axial direction of the pole will often free the snagged line. If does not free the snagged line, other maneuvers are equally easy to make in view of the streamlined nature of the device.

A further advantage of this invention is that the pole may be telescopable such that it can be retracted to a single section length. This makes it easy to transport the pole by boat or to carry it by person to the fishing area.

Also, when the pole is extended, the individual sections may be interlocked to render the pole stable. A highly efficient spring-button assembly may be provided if desired.

Yet another advantage is that the devices according to this ivention are relatively effective and are capable of freeing most snagged lines.

Furthermore, the devices are relatively inexpensive and durable. There are no readily breakable parts or parts that need periodic maintenance.

Certain embodiments of the invention will not be described in accordance with the accompanying drawings, wherein:

BRIEF DESCRIPTION OF THE DRAWINGS

FIG. 1 is a graphic illustration of a fisherman using the device according to this invention to free a snagged fish line.

FIG. 2 is a side view of one embodiment of this invention, with the tip being enlarged for clarity.

FIG. 3 is a side view of a second embodiment of a tip which can be employed in the practice of this invention.

FIG. 4 is a graphic illustration showing the tip illustrated in FIG. 3 in perspective and in use freeing a snagged fishhook and lure.

FIG. 5 is a further enlarged view of the tip of the embodiment of this invention illustrated in FIG. 2.

FIG. 6 is an expanded view taken along reference line 6—6 of FIG. 2.

DETAILED DESCRIPTION OF THE DRAWINGS

Referring to the Figures, in particular FIG. 1, as stated above, this Figure is a graphic representation showing device 10 in accordance with this invention in use. In this Figure, fishhook and lure assembly 12 is snagged on a tree stump underwater. Device 10 has tip 14 located on its lowermost end which is in engagement with fish line 16 which, in turn, is connected to the snagged fishhook and lure assembly 12.

Device 10 is further illustrated in FIG. 2. Device 10 includes pole 18. Tip 14 is attached to a first end of pole 18. Handle 20 is attached to the other end of pole 18. Handle 20 may be comprised of rubber or other similar material with good gripping capability.

In the embodiment illustrated in FIG. 2, pole 18 is a telescopable pole comprising of sections 22, 24, 26 and 28. These sections are elongated and telescopable so that device 10 can be retracted for storage, to more easily transport and so that the device can be adjusted to different lengths depending on the depth of the water it is to be used in. In the embodiment of the invention illustrated in FIG. 2, sections 22, 24, 26 and 28 are elongated hollow tubes of decreasing diameter from tube 22 through tube 28. Therefore, tube 28 slides and fits within tube 26, tube 26 slides and fits within tube 24 and tube 24 slides and fits within tube 22. These sections are preferably comprised of a lightweight yet structurally strong material such as aluminum, however, almost any material can be employed. While pole 18 has four sections in FIG. 2, any number of sections can be employed, as long as the pole remains inflexible when extended.

A typical joint between adjacent sections 22, 24, 26 and 28 is illustrated in FIG. 6. Specifically, this Figure illustrates the connection between section 24 and section 26. The other connections between the remaining adjacent sections (between sections 22 and 24 and between sections 26 and 28) may be constructed in the same manner.

Section 24 as an inward flange 30 at its lowermost end. Flange 30 has a diameter smaller than the diameter of the rest of section 24, forming outer shoulder 34. Section 26 has an outwardly extending flange 32 at its uppermost end. Flange 30 has a diameter larger than the diameter of the rest of section 26, forming inner shoulder 36. Flange 30 also is designed such that its innermost diameter is slightly larger than the outermost diameter of section 26. Likewise, flange 32 is designed such that its outermost diameter is slightly less than the innermost diameter of section 24. This permits sliding motion between the two sections. The designing of sections 24 and 26 in this manner, with the flanges 30 and 32 and shoulders 34 and 36, prevents sections 24 and 26 from being over-extended. When shoulders 34 and 36 are in abutment, the sections 24 and 26 are held snug and prevented from further extension with respect to each other.

Sections 24 and 26 are also interconnected by spring button assembly 38. Spring button assembly 38 includes spring 40 and button head 42. Button head 42 is affixed on one end of spring 40 and extends upward through hole 44 in section 26. Button head 42 is designed such that its lowermost portion will not fit through hole 44, to prevent button head 42 from completely passing through hole 44. Button head 42 extends, in the engaged position, above tube 26 such that the lowermost end of flange 30 abuts against the upper portion of button head 42. Thus, when button head 42 is in the engaged position, as shown in FIG. 6, tubes 24 and 26 cannot move towards each other.

The lowermost end of spring 40 abuts the interior wall of tube 26 as shown in FIG. 6. While in this embodiment, spring 40 is held in place by friction fits, spring 40 may be affixed to tube 26 by connection means including welding, straps, etc.

When it is desired to retract tube 26 within tube 24 from the engaged position, button head 42 is pushed downward below the surface of flange 30 and tube 26 is slide relative to tube 24. During this movement, the uppermost edge of button head 42 slides along the interior wall of tube 24.

Many other connection assemblies can be employed in place of spring button assembly 38. For example, a two-headed spring button assembly may be employed or a non-spring latching assembly may be employed.

Tip 14 is illustrated in a further expanded view in FIG. 5. In this embodiment, tip 14 is a single wire element extending outwardly from the end of pole section 28. Tip 14 is comprises of, in sequence, straight portions 46, 48, 50, 52, 54, 56, 60 and 62. Straight portion 46 extends away from the end of pole 18, preferably along the longitudinal axis of pole 18. Straight portion 48 extends perpendicularly to pole 18, outwardly from the longitudinal axis of pole 18. Straight portion 50 extends parallel to the longitudinal axis of pole 18 and away from pole 18. Straight portion 52 extends perpendicularly to the longitudinal axis of pole 18 and crosses the longitudinal axis. Straight portion 54 extends back towards pole 18 in parallel relationship thereto. Straight portion 56 extends perpendicular to and towards the longitudinal axis of pole 18. Straight portion 58 extends parallel to the longitudinal axis of pole 18 beyond the end of pole 18. Straight portion 60 extends perpendicular to the longitudinal axis of pole 18 and crosses that axis. Straight portion 62 extends parallel to the longitudinal axis of pole 18 in parallel overlapping relationship with straight portion 50 and 54.

Straight portions 46, 48, 50, 52, 54, 56, 58, 60 and 62 are connected in sequence by curved portions 64, 66, 68, 70, 72, 74, 76 and 78, respectively.

Tip 14 is basically a flat element lying in the same plane as the longitudinal axis of pole 18. A continuous outer surface is formed, in sequence, by straight portion 46, curved portion 64, straight portion 48, curved portion 66, straight portion 50, curved portion 68, straight portion 52, curved portion 70, straight portion 54, curved portion 72, straight portion 56 and curved portion 74.

Tip 14 is designed such that passageway 80 is formed between straight portion 58 and pole 18, passageway 82 is formed between straight portions 48 and 60 and passageway 84 is formed between straight portions 50 and 62. In addition space 86 is formed in part by straight portions 52, 54, 60 and 62 and line engaging area 88 is formed by straight portions 54, 56 and 58.

Tip 14 is employed by maneuvering device 10 such that the snagged fish line enters tip 14 through passageway 80, passes through passageways 82 and 84 and space 86 to line engaging area 88. Once the fish line is received within line engaging area 88, device 10 is ready for employement to free a snagged fishhook and lure. Straight portion 52 can be employed to push on the fishhook and lure if necessary.

Another tip embodiment of this invention is illustrated in FIGS. 3 and 4, tip 90. Tip 90 is a flat plate of general oblong shape having two side faces. Tip 90 includes main portion 92 and end portion 94. Main portion 92 is attached to pole 18' by crimp connection 96. Main portion 92 can be of course attached to pole 18' by any other well known connecting method. Tip 90 is designed such that it has a continuous outer surface 100, except at opening 108 as discussed below. Passageway 98 and interior line engaging area (or eye) 102 are formed in main portion 92 and extend through the thickness of the plate.

In the embodiment illustrated in FIGS. 3 and 4, passageway 98 is formed by straight portion 104 and curved portion 106. The first end of straight portion 104 opens into the exterior of tip 92 and forms opening 108 in outer surface 100. The second end of straight portion 104 is integral and continuous with the first end of curved portion 106. The second end of curved portion 106 forms opening 110 into eye 102. Thus, passageway 98 is generally of a "hook-shape" extending from exterior surface 100 to eye 102. Also, passageway 98 has a linear component in the direction of the longitudinal axis of pole 18.

End portion 94 includes two bumps 112 and 114 with a straight surface 116 therebetween. Straight surface 116 and bumps 112 and 114 thus form the forward surface of tip 90.

Since tip 90 is of oblong shape, shoulder 118 and 120 are formed on tip 90 adjacent the lowermost end of pole 18'. This enables one to use the device by engaging the fish line with the device near the lower end of pole 18' or on shoulder 118. Tip 90 can then be easily maneuvered such that the fish line enters passageway 98 through opening 108, travels down straight portion 104 and curved portion 108 into eye 102 through opneing 110. Once the fish line is in eye 102, it is ready for use in unsnagging the fishhook and lure as illustrated in FIG. 4.

As illustrated in FIG. 4, tip 90 can be lowered, after the fish line has been received within eye 102, to push on snagged lure 122 and fishhook 124 if necessary by engaging straight surface 116 on lure 122.

The devices according to this invention are employed whether the device is equipped with tip 14, tip 90, or any other tip in accordance with this invention, by first expanding pole 18 or 18' to the desired and appropriate length. This is done by sliding the sections 24, 26 and 28 outward from section 22 as desired. Spring button assemblies 38 will lock the extended sections in place. The tip is then maneuvered near the snagged line, preferably as close to the snagged fishhook and lure as possible. The device is maneuvered to guide the line through the passageway(s) to the interior line engaging area (or eye). Once the fish line is in the interior line engaging area, the device is slid along the snagged fish line to the fishhook and lure. Once the tip is adjacent the lure, a tap in the direction of the longitudinal axis of the pole will usually free the lure. The device can then be removed from the fish line by guiding the line out of the interior line engaging area through the passageway(s) to the exterior of the tip. Next, the various sections of the pole can be retracted.

Certain preferred embodiments of this invention have been described in detail above. Other embodiments, modifications and improvements of this invention will become apparent to those skilled in theart once given this disclosure. Such other embodiments, modifications and improvements are considered to be within the scope of this invention as defined by the following claims:

What is claimed is:

1. A device for engaging and manipulating a snagged fish line comprising:
a pole having first and second ends; and
a tip attached to said first end, said tip comprising a
substantially continuous outer surface of a solid member,
an interior line engaging area inward of said outer surface, said line engaging area extending through said tip,
a barrier separating said outer surface and said line engaging area, and
a passageway from said outer surface to said line engaging area,
said interior line engaging area comprising an eye in said tip, the axis of said eye being perpendicular to the longitudinal axis of said pole,
said passageway is hook shaped, having a straight portion and a curved portion, each of said straight and curved portions having first and second ends, said first end of said straight portion opening to the exterior of said tip and said second end of said straight portion interfacing with said first end of said curved portion, said second end of said curved portion opening into said line engaging area.

2. A device according to claim 1 wherein said passageway has linear components parallel and perpendicular to the longitudinal axis of said pole.

3. A device according to claim 1 wherein
said tip is flat and oriented parallel to the longitudinal axis of said pole.

4. A device according to claim 1 wherein
said tip has a flat surface opposite said pole.

5. A device according to claim 1 wherein
said eye is oval-shaped.

6. A device according to claim 1 wherein
said tip includes a shoulder portion adjacent said first end of said pole,
said first end of said straight portion is located adjacent said pole on said shoulder portion.

7. A device according to claim 1 wherein
said member is a plate member having side faces,
said side faces of said plate member lie substantially parallel to the longitudinal axis of said pole.

8. A device according to claim 1 wherein
said pole is comprised of telescopable sections,
said sections are interlockable with respect to each other.

9. A device according to claim 8 further comprising snap lock assemblies to selectively interlock each of said adjacent sections.

10. A device according to claim 9 wherein
each of said snap lock assemblies includes a spring loaded button which projects through holes in said sections to interlock said sections.

11. A device according to claim 10 wherein
said sections are tubes, the diameters of said tubes decreasing from said second end of said pole to said first end of said pole.

12. A device according to claim 11 wherein
said adjacent sections overlap at the interface of each pair of said adjacent sections,
the larger tube of said pair having an inward flange at the interface and said smaller tube of said pair having an outward flange at the interface,
said inward flange having an inner diameter slightly larger than the exterior diameter of said smaller tube and said outward flange having an outer diameter slightly smaller than the inner diameter of said larger tube.

13. A device for engaging and manipulating a snagged fish line comprising:
a pole having first and second ends; and
a tip attached to said first end, said tip comprising a curved wire lying in a plane substantially parallel to the longitudinal axis of said pole, having an outer surface and including, in sequence
a first portion perpendicular to the longitudinal axis of said pole, a second portion parallel to the longitudinal axis of said pole and extending away from said pole, a third portion perpendicular to the longitudinal axis of the pole and extending past the longitudinal axis of said pole, a fourth portion parallel to the longitudinal axis of said pole and extending back towards said pole, a fifth portion perpendicular to the longitudinal axis of said pole and extending towards said pole, a sixth portion parallel to said longitudinal axis of said pole in parallel overlapping relationship with said fourth portion, a seventh portion extending perpendicular to said longitudinal axis of said pole, and an eighth portion extending parallel to said longitudinal axis of said pole in overlapping relationship with said second portion.

14. A device according to claim 13 wherein
a passageway is formed by said first, second, sixth, seventh and eighth portions which extends from said outer surface to a line engaging area;
said line engaging area is formed by said fourth, fifth and sixth portions.

15. A device according to claim 14 wherein
said fourth and sixth portions overlap said pole.

16. A device according to claim 15 wherein
said first end of said pole forms a portion of said passageway.

* * * * *